United States Patent
Schmidt

(10) Patent No.: US 10,487,902 B2
(45) Date of Patent: Nov. 26, 2019

(54) VIBRATION DAMPER FOR A MOTOR VEHICLE

(71) Applicants: THYSSENKRUPP BILSTEIN GMBH, Ennepetal (DE); thyssenkrupp AG, Essen (DE)

(72) Inventor: Klaus Schmidt, Odenthal (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/745,866

(22) PCT Filed: Jul. 12, 2016

(86) PCT No.: PCT/EP2016/066487
§ 371 (c)(1),
(2) Date: Jan. 18, 2018

(87) PCT Pub. No.: WO2017/016867
PCT Pub. Date: Feb. 2, 2013

(65) Prior Publication Data
US 2018/0209505 A1    Jul. 26, 2018

(30) Foreign Application Priority Data

Jul. 27, 2015  (DE) .................. 10 2015 112 180

(51) Int. Cl.
*F16F 9/54* (2006.01)
*F16F 9/34* (2006.01)
(Continued)

(52) U.S. Cl.
CPC ............. *F16F 9/34* (2013.01); *B60G 13/08* (2013.01); *B60G 17/08* (2013.01); *F16F 9/18* (2013.01);
(Continued)

(58) Field of Classification Search
CPC ..... F16F 9/46; F16F 9/325; F16F 9/464; F16F 9/465
(Continued)

(56) References Cited

U.S. PATENT DOCUMENTS 4,802,561 A * 2/1989 Knecht ............... F16F 9/465
188/266.6
4,850,460 A * 7/1989 Knecht ............... F16F 9/46
188/266.6
(Continued)

FOREIGN PATENT DOCUMENTS

CN   103711832 A   4/2014
DE   19624898 A    1/1998
(Continued)

OTHER PUBLICATIONS

English Translation of International Search Report issued in PCT/EP2016/066487, dated Oct. 11, 2016 (dated Oct. 21, 2016).

*Primary Examiner* — Christopher P Schwartz
(74) *Attorney, Agent, or Firm* — thyssenkrupp North America, Inc.

(57) ABSTRACT

A vibration damper for a motor vehicle may include a damper tube, a piston rod that moves in the damper tube, a working piston attached to the piston rod that divides the damper tube into two working spaces, and first and second damping valves each with an adjustable damping force. Damping liquid may pass through the first damping valve as the piston rod retracts and through the second damping valve as the piston rod extends. Each damping valve may include a valve body that can be moved by a separate, controllable drive device between a closed position and an open position to set a throughflow cross section of each respective damping valve. The valve bodies may be loaded by restoring means counter to an actuating force of the drive device. A first of the restoring means may load a first of the valve (Continued)

bodies into its open position, and a second of the restoring means may load a second of the valve bodies into its closed position.

7 Claims, 2 Drawing Sheets

(51) Int. Cl.
| | |
|---|---|
| *F16F 9/516* | (2006.01) |
| *B60G 13/08* | (2006.01) |
| *B60G 17/08* | (2006.01) |
| *F16F 9/18* | (2006.01) |
| *F16K 31/06* | (2006.01) |

(52) U.S. Cl.
CPC .......... *F16F 9/516* (2013.01); *B60G 2206/41* (2013.01); *B60G 2500/11* (2013.01); *B60G 2600/182* (2013.01); *B60G 2800/162* (2013.01); *F16F 2228/066* (2013.01); *F16F 2230/00* (2013.01); *F16K 31/0644* (2013.01)

(58) Field of Classification Search
USPC .......... 188/266.6, 322.13, 282.6, 318, 322.2
See application file for complete search history.

(56) References Cited

U.S. PATENT DOCUMENTS

| | | | | |
|---|---|---|---|---|
| 5,586,627 | A * | 12/1996 | Nezu .................. | B60G 17/08 |
| | | | | 188/266.6 |
| 6,182,805 | B1 * | 2/2001 | Kashiwagi .............. | F16F 9/325 |
| | | | | 188/266.6 |
| 8,613,348 | B2 * | 12/2013 | Hamers .................. | F16F 9/464 |
| | | | | 188/282.6 |
| 2004/0011612 | A1 | 1/2004 | Toiyama | |
| 2007/0125610 | A1 | 6/2007 | Goetz | |
| 2009/0120749 | A1 | 5/2009 | Kolz | |
| 2009/0189363 | A1 | 7/2009 | Fritz | |
| 2011/0042174 | A1 | 2/2011 | Hamers | |
| 2012/0145496 | A1 | 6/2012 | Goetz | |
| 2013/0126282 | A1 * | 5/2013 | De Lillo ................ | B60G 13/06 |
| | | | | 188/313 |

FOREIGN PATENT DOCUMENTS

| | | |
|---|---|---|
| DE | 102006025576 B | 12/2007 |
| DE | 102008015412 A | 10/2009 |
| DE | 102012109437 A | 4/2014 |
| DE | 102013114169 A | 6/2015 |
| EP | 0 634 298 A | 1/1995 |
| EP | 0651174 A | 5/1995 |
| EP | 1538366 A | 6/2005 |
| EP | 2813737 A | 12/2014 |
| JP | 2013-104497 A | 5/2013 |
| JP | 2013-181644 A | 9/2013 |

* cited by examiner

VIBRATION DAMPER FOR A MOTOR VEHICLE

CROSS REFERENCE TO RELATED APPLICATIONS

This application is a U.S. National Stage Entry of International Patent Application Serial Number PCT/EP2016/066487, filed Jul. 12, 2016, which claims priority to German Patent Application No. DE 10 2015 112 180.8, filed Jul. 27, 2015, the entire contents of both of which are incorporated herein by reference.

FIELD

The present disclosure generally relates to vibration dampers, including methods of operating vibration dampers for motor vehicles.

BACKGROUND

DE 10 2008 015 412 has disclosed a vibration damper of this type. Said vibration damper comprises a damper tube which is filled with damping liquid, a piston rod which can be retracted and extended in the damper tube, a working piston which is attached to the piston rod and divides the interior space of the damper tube into a piston rod-side working space and a working space which is remote from the piston rod, and a first and a second damping valve in each case with a separately adjustable damping force. The first damping valve is passed through by the damping liquid in the case of a retraction movement, and the second damping valve is passed through by the damping liquid in the case of an extension movement of the piston rod. The damping force of the two damping valves is set by way of in each case one separate electrically controllable drive device. Each damping valve comprises a valve body which can be moved in a defined manner between a closed position and an open position using the drive device. The valve bodies are loaded into a closed position in each case by way of a restoring means.

In a currentless state, the valve body of the two damping valves is situated in a closed position on account of the loading by way of the restoring means; as a consequence, the damping valves are what are known as "normally closed" valves (NC valves). Although satisfactory emergency running properties (failsafe behavior) can in principle be set by way of valves of this type, NC valves of this type have a high energy consumption since energy has to be consumed continuously, in order to achieve at least partial opening of the valve.

Although what are known as "normally open" valves (NO valves) might be used instead of the NC valves, NO valves of this type are loaded into their open position by way of restoring means and therefore require less energy during normal operation than NC valves. Said NO valves are not suitable for setting emergency running properties, however, since, in the currentless state, the damping liquid can flow through the valve in a largely unimpeded manner, and a soft characteristic is therefore produced.

As a consequence, it is an object of the present invention Thus a need exists to reduce the energy consumption of a vibration damper of the generic type, but at the same time to ensure that the vibration damper has sufficient emergency running properties.

DETAILED DESCRIPTION

Figure 1:
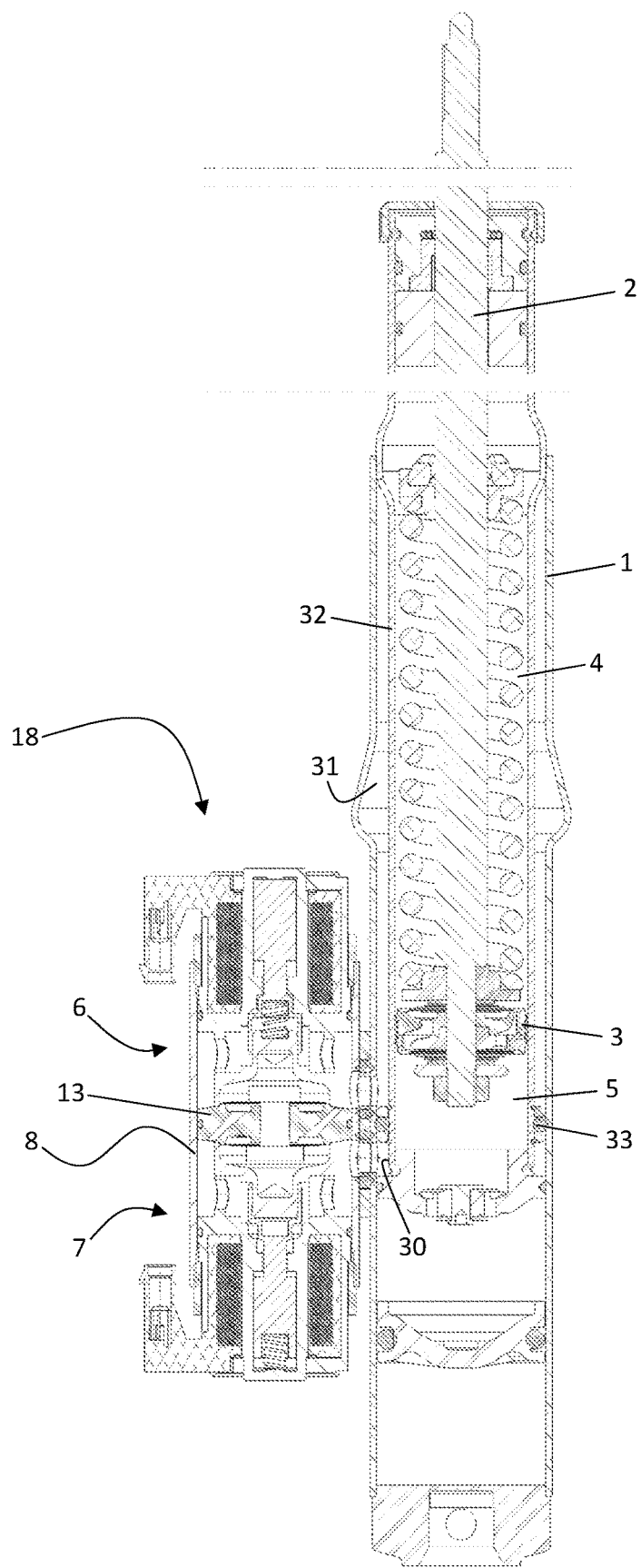
FIG. 1 is an axial sectional view of an example vibration damper.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a vibration damper is distinguished by the fact that a first of the restoring means is arranged in such a way that said restoring means loads a first of the valve bodies into its open position, and a second of the restoring means is arranged in such a way that said restoring means loads a second of the valve bodies into its closed position. Advantageous developments of the invention are specified in the dependent claims.

A further subject matter of the invention is a method for operating a vibration damper for a motor vehicle, the vibration damper comprising:
  a damper tube which is filled at least partially with damping liquid,
  a piston rod which can be retracted and extended in the damper tube,
  a working piston which is attached to the piston rod and divides an interior space of the damper tube into a first working space and a second working space,
  a first and a second damping valve in each case with an adjustable damping force.

The first damping valve is passed through by the damping liquid in the case of a retraction movement, and the second damping valve is passed through by the damping liquid in the case of an extension movement of the piston rod. Each damping valve comprises a valve body which is moved in a defined manner between a closed position and an open position, as a result of which a throughflow cross section of the respective damping valve is set in a targeted manner. The method comprises the following method steps: targeted setting of the position of each valve body by way of a separate, controllable drive device, loading of the valve bodies in each case by way of a restoring means counter to the actuating force of the drive device. A first of the restoring means loads a first of the valve bodies into its open position, and a second of the restoring means loads a second valve body into its closed position.

The core concept of the invention then lies in configuring one of the damping valves as an NC valve and the other as an NO valve. It has been proven that it is sufficient for the emergency running properties if a hard characteristic is produced merely in one of the rebound or compression stages. In the case of a correspondingly hard characteristic, the vertical vehicle movement can already be damped to a sufficiently hard extent in one of the stages, in such a way that a hard characteristic can be dispensed with in the other stage. For said other stage, the more energy-efficient NO valve can then be used, as a result of which the damping valve overall is of more energy-efficient configuration.

The damping valves are configured, in particular, as electromagnetically operable, continuously adjustable actuating valves.

The invention can be applied, in particular, in the case of those vibration dampers, in which said damping valves are main damping valves. The main damping valve can be arranged in the piston, in particular in the case of monotube dampers, or can be a constituent part of a piggyback valve.

Main damping valves of this type are arranged, in particular, in the main volumetric flow, as provided in the present exemplary embodiment, for example. Since the main volumetric flow is considerably greater in most operating states than, for example, a volumetric flow, by way of which merely a pilot control pressure is set, valves of this type consume a comparatively great amount of energy. Therefore, the requirement for energy saving is particularly high in the case of vibration dampers of this type. A flow of damping liquid through the main damping valve, which flow flows from one working space into the other working space on account of the piston movement and in the process, in particular in the operating state at the high piston speed, makes up the greatest proportion of the flowing fluid is called the main volumetric flow. In contrast to this, a volumetric flow through a pilot control valve does not fall under the designation of main volumetric flow.

It is particularly advantageous if the NC valve is arranged in the damping valve which is passed through by the main volumetric flow in the rebound stage. This is because the characteristics of the rebound stage as a rule have greater spreads than the characteristics of the compression stage. Therefore, a hard characteristic can be set in the rebound stage for the emergency running case, and can therefore damp the vehicle in a considerably harder manner solely by way of the hard characteristic in the rebound stage.

The two end positions of the damping valve are called the open and the closed position, a throughflow cross section through the damping valve being greater in the open position than in the closed position. An absolute seal in the closed position is not required, however.

In the case of a retraction movement of the piston rod (compression stage), the piston rod is dipped further into the damper tube, and the working piston is moved in the process in the direction of the working space which is remote from the piston rod. In the case of an extension movement of the piston rod (rebound stage), sections of the piston rod are pulled out of the damper tube, and the working piston is moved in the process in the direction of the piston rod-side working space.

The further refinements and advantages mentioned with regard to the apparatus can be applied analogously to the method.

Figure 2:
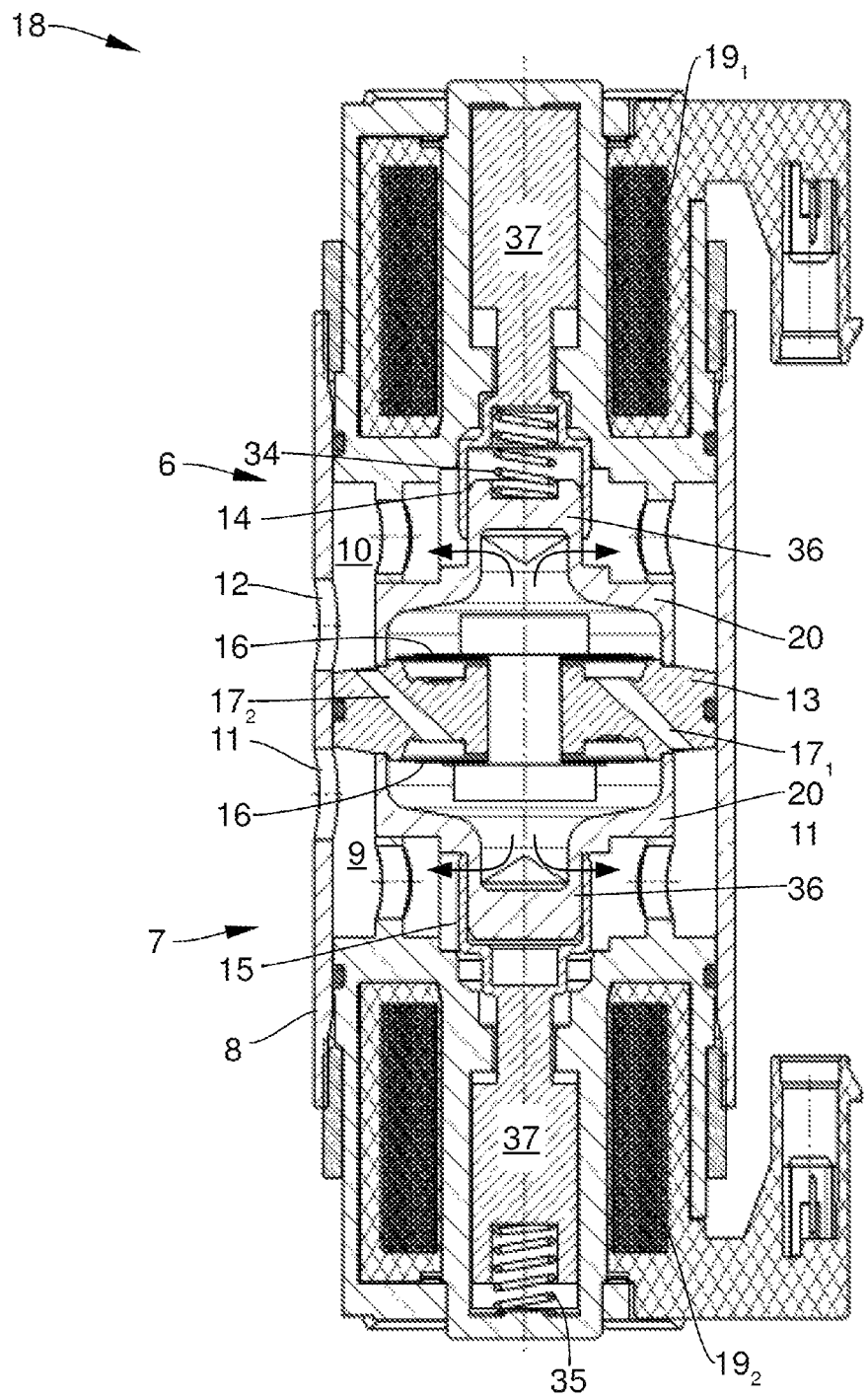
FIG. 2 is an axial sectional view of an example piggyback valve of the vibration damper according to FIG. 1.

FIG. 1 shows a vibration damper according to the invention with a piggyback valve 18 which is attached to a damper tube 1, which vibration damper is based largely on the vibration damper which is disclosed in DE 10 2008 015 412 A1. A piston rod 2 is held in the damper tube 1 such that it can be retracted and extended. A working piston 3 is attached to the one end of the piston rod 2, which working piston 3 divides the damper tube interior space into a piston rod-side working space 4 and a working space 5 which is remote from the piston rod. The piggyback valve 18 has a housing 8, in which two continuously adjustable main damping valves 6, 7 are arranged. Via said main damping valves 6, 7, the damping force of the vibration damper can be set for the rebound stage and the compression stage separately and independently of one another. The main damping valves 6, 7 and the further construction of the piggyback valve are indicated merely by way of example in the illustration of FIG. 1. FIG. 2 discloses the details according to the invention of the piggyback valve 18.

The feeding of the damping liquid to the main damping valves 6, 7 takes place via a first flow feed line 30 in the case of a retraction movement of the piston rod and via a second flow feed line 31 in the case of an extension movement of the piston rod. The flow feed lines 30, 31 are formed by way of a separating tube 30 which is inserted into the damper tube 1, and are sealed with respect to one another via a seal element 33.

FIG. 2 shows an axial section of the piggyback valve 18 according to the invention of the vibration damper according to FIG. 1, in which the housing 8 is of cylindrical configuration. The housing 8 has two connector bores 11, 12, via which in each case one hydraulic space 9, 10 of the piggyback valve 18 is connected to one of the two working spaces 4, 5. A dividing wall 13 which separates the two hydraulic spaces 9, 10 from one another is provided between the two hydraulic spaces 9, 10.

The two main damping valves 6, 7 are arranged in the housing 8. The first main damping valve 6 is arranged above the dividing wall 13 in the illustration according to FIG. 2, whereas the second main damping valve 7 is arranged below the dividing wall 13 in the illustration according to FIG. 2. The first and the second main damping valves 6, 7 in each case comprise a first and a second valve body 14, 15 which interacts with a cylindrical part of a deflection element 36, through which flow can pass. One or more throttle openings are provided in the shell of the cylindrical part of the deflection element 36, which throttle openings can either be closed completely, covered partially or opened completely by way of the hollow-cylindrical part of the valve body 14, 15, depending on which axial position the associated valve body 14, 15 assumes. For this purpose, each valve body 14, 15 can be displaced in an infinitely variable manner between an open position, in which it opens the throttle openings, and a closed position, in which it closes the throttle openings.

If the throttle openings are closed completely by way of the valve body 14, 15, the respective main damping valve 6, 7 cannot be passed through by the damping liquid. In this case, the damping force of the vibration damper has to be generated via the damping force generation devices of the working piston 3. If, in contrast, the throttle openings are opened completely or partially by the valve body 14, 15, a damping force is generated during the throughflow of the throttle openings. The smaller the throughflow cross section of the throttle openings, the greater the damping force which is generated.

In order for it to be possible to displace the valve body 14, 15 axially, a separate electromagnetic drive device 19 is provided for each of the valve bodies 14, 15, which drive device 19 can continuously adjust an armature 37 of the respective valve body 14, 15 over a predefined adjusting travel in a manner known per se. In this way, every desired throughflow cross section of the throttle openings and therefore every desired damping force can be set.

The piggyback valve 18 according to the invention operates as follows:

In the case of a retraction movement of the piston rod 2 (compression stage), that is to say if the piston rod 2 dips into the damper tube 1, the working piston 3 presses damping liquid out of the working space 5 which is remote from the piston rod via the bore 11 into the first hydraulic space 9. The damping liquid flows from said first hydraulic space 9 through a first channel 171 in the dividing wall 13. The damping liquid is fed via the first channel 171 to a passive damping element 16 of the first main damping valve 6, which damping element 16 generates a damping force which is dependent on the flow speed of the damping liquid, and additionally acts as a one-way valve. The damping liquid flows via the passive damping element 16 into the deflection element 36 of the first main damping valve 6. The flow is deflected radially to the outside in the cylindrical part of the deflection element 36, on which the hollow-cylindrical part of the first valve body 14 is guided axially. Here, the damping liquid flows through the throughflow cross section of the throttle openings which is opened by the first valve body 14, and enters into the second hydraulic space 10. The damping liquid then flows out of the second hydraulic space 10 through the second bore 12 into the piston rod-side working space 4. The throughflow openings cannot be seen in the illustration of FIG. 2, and the arrows are intended to indicate the approximate path of the flow in the region of the throttle openings.

In the case of an extension movement of the piston rod 2 (rebound stage), the working piston 3 presses damping liquid out of the piston rod-side working space 4 through the bore 12 into the second hydraulic space 10. The damping liquid flows from said second hydraulic space 10 through a second channel 172 of the dividing wall 13. The damping liquid is fed via said second channel 172 to a passive damping element 16 of the second main damping valve 7, which damping element 16 generates a damping force which is dependent on the flow speed of the damping liquid. The damping liquid flows via the passive damping element 16 into the deflection element 36 of the second main damping valve 6. The flow is deflected radially to the outside in the cylindrical part of the deflection element 36, on which the hollow-cylindrical part of the second valve body 15 is guided axially. Here, the damping liquid flows through the throughflow cross section of the throttle openings which is opened by the second valve body 15, and enters into the first hydraulic space 9. The damping liquid then flows out of the first hydraulic space 9 through the first bore 11 into the working space 5 which is remote from the piston rod. The arrows are also intended to indicate the approximate path of the flow in the region of the throttle openings here.

The dividing wall 13 separates the two hydraulic spaces 9, 10 from one another hydraulically, and ensures a correct central inflow of the damping valves 6, 7 with the channels 171, 172.

The two valve bodies 14, 15 are loaded in each case by way of a first and second restoring spring 34, 35 which counteracts the respective drive device 19. The first restoring spring 34 is arranged in such a way that it loads the first valve body 14 into its open position. The drive device 191 which belongs to the first damping valve 6 counteracts said first restoring spring 34 and loads the first valve body 14 into its closed position depending on the actuation. As a consequence, the first main damping valve is an NO valve which is closed in the currentless state (normally open=NO).

The second restoring spring 35 is arranged in such a way that it loads the second valve body 15 into its closed position. The drive device 192 which belongs to the second damping valve 7 counteracts said second restoring spring 35 and loads the second valve body 15 into its open position depending on the actuation. As a consequence, the second main damping valve 7 is a valve which is closed in the currentless state (normally closed=NC).

In this embodiment, the NC valve is assigned to the rebound stage. Since the characteristics of the rebound stage as a rule have greater spreads, a hard characteristic can be set for the emergency running case here, and can therefore damp the vehicle in a considerably harder manner solely by way of the hard characteristic in the rebound stage.

A correspondingly swapped embodiment, namely that the second restoring spring 35 is arranged in such a way as to load the second valve body 15 into its open position, and that the first restoring spring 34 is arranged in such a way as to load the first valve body 14 into its closed position, is nevertheless possible, however.

In principle, the invention can also be applied in the case of controllable damping valves which are arranged in the piston.

The implementation of the invention is not restricted to the preferred exemplary embodiment which is indicated in the preceding text. Rather, a number of variants are conceivable which use the illustrated solution even in the case of embodiments of fundamentally different types. All of the features and/or advantages which are apparent from the claims, the description or the drawings, including structural details or spatial arrangements, can be essential to the invention both per se and in a very wide variety of combinations.

In principle, the invention can also be applied in the case of damping valves which are not main damping valves and, as a consequence, are not arranged in a main volumetric flow of the damping liquid. The invention can thus also be applied in the case of damping valves, by way of which a pilot control pressure is set separately for the rebound and compression stage, in a comparable manner to a vibration damper as described in the German patent application 10 2013 114 169.2 A1, but provided that two valve bodies which can be actuated separately for the compression and the rebound stage are provided (one is provided with the designation 32 in said document). In contrast, the main volumetric flow is conducted in said document through the main damping valves (see the designations 13, 23 in said document) and the fluid leadthroughs (see the designations 12, 22 in said document).

LIST OF DESIGNATIONS

1 Damper tube
2 Piston rod
3 Working piston
4 Piston rod-side working space
5 Working space which is remote from the piston rod
6 First damping valve
7 Second damping valve
8 Housing of the piggyback valve
9 First hydraulic space
10 Second hydraulic space
11 Connector bore
12 Connector bore
13 Dividing wall
14 First valve body
15 Second valve body
16 Passive damping element
17 Channel
18 Piggyback valve
19 Electromechanical drive device
20 Valve housing
30 First flow feed line
31 Second flow feed line
32 Separating tube 33 Seal element
34 First restoring means
35 Second restoring means
36 Deflection element, through which flow can pass
37 Armature

What is claimed is:

1. A vibration damper for a motor vehicle comprising:
a damper tube that is filled at least partially with damping liquid;
a piston rod that is retractable and extendable in the damper tube;
a working piston that is attached to the piston rod and divides an interior space of the damper tube into a first working space and a second working space;
first and second damping valves that each have an adjustable damping force, wherein the damping liquid passes through the first damping valve when the piston rod retracts and the damping liquid passes through the second damping valve when the piston rod extends, wherein each of the first and second damping valves comprises a valve body that is movable between a closed position and an open position to set a through-flow cross section of the respective damping valve, wherein the valve bodies are positionable by a separate, controllable drive device; and
restoring means for loading the valve bodies counter to an actuating force of the separate, controllable drive device, wherein a first of the restoring means is configured to load a first of the valve bodies into the open position, wherein a second of the restoring means is configured to load a second of the valve bodies into the closed position.

2. The vibration damper of claim 1 wherein the damping valves are electromagnetically operable, continuously adjustable actuating valves.

3. The vibration damper of claim 1 wherein the damping valves are main damping valves and are disposed directly in a main volumetric flow of the vibration damper.

4. The vibration damper of claim 1 wherein the second of the restoring means, which is configured to load the second of the valve bodies into the closed position, is assigned to the second damping valve through which the damping liquid passes when the piston rod extends in a rebound stage.

5. The vibration damper of claim 1 wherein the first of the restoring means, which is configured to load the first of the valve bodies into the open position, is assigned to the first damping valve through which the damping liquid passes when the piston rod retracts in a compression stage.

6. The vibration damper of claim 1 wherein the first of the restoring means, which is configured to load the first of the valve bodies into the closed position, is assigned to the first damping valve through which the damping liquid passes when the piston rod retracts in a compression stage.

7. A method of damping vibrations in a motor vehicle with a vibration damper that includes a damper tube that is filled at least partially with damping liquid, a piston rod that is retractable and extendable in the damper tube, a working piston that is attached to the piston rod and divides an interior space of the damper tube into a first working space and a second working space, and first and second damping valves that each have an adjustable damping force, wherein the damping liquid passes through the first damping valve when the piston rod retracts and the damping liquid passes through the second damping valve when the piston rod extends, wherein each of the first and second damping valves comprises a valve body that is movable between a closed position and an open position to set a throughflow cross section of the respective damping valve, the method comprising:
setting a position of each valve body by way of a separate, controllable drive device; and
loading each of the valve bodies by way of restoring means counter to an actuating force of the separate, controllable drive device, wherein a first of the restoring means loads a first of the valve bodies into the open position, wherein a second of the restoring means loads a second valve body into the closed position.

* * * * *